Sept. 10, 1946.  C. E. KRAUS  2,407,502
MILLING CUTTER
Filed Sept. 11, 1944
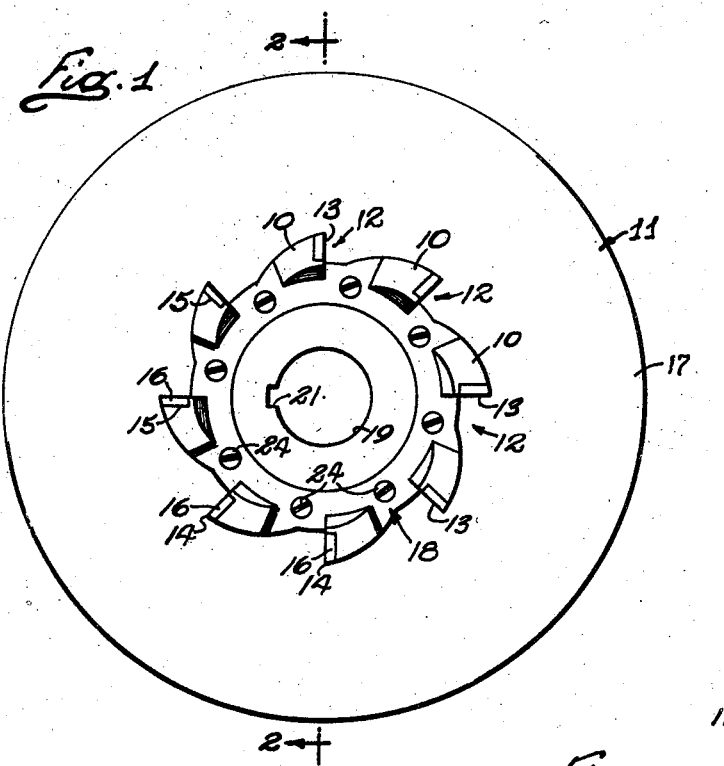
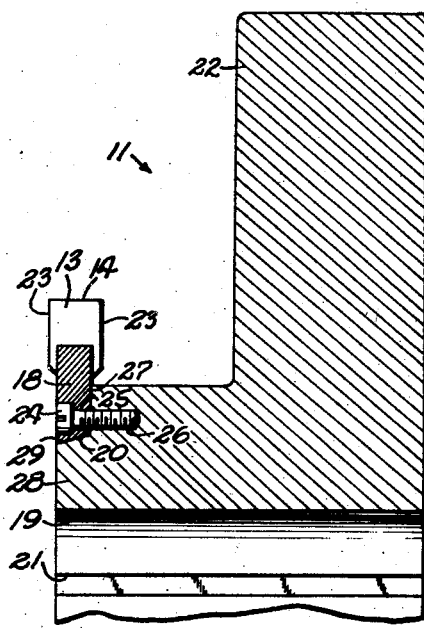
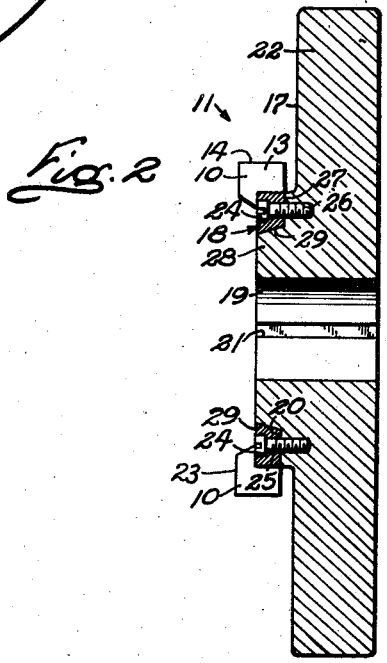
INVENTOR
Charles E. Kraus
By Carlson, Pitzner, Hubbard & Wolfe
ATTORNEYS Patented Sept. 10, 1946

2,407,502

UNITED STATES PATENT OFFICE 2,407,502

MILLING CUTTER

Charles E. Kraus, Rochester, N. Y.

Application September 11, 1944, Serial No. 553,576

4 Claims. (Cl. 29—103)

This invention relates to rotary milling cutters and in certain of its aspects relates to cutters of the type in which the teeth are integral with or bonded to a supporting body. One or more teeth of such cutters may become damaged in service use necessitating building up of the tooth or replacement of its tip. Heating of the cutter incident to such repair frequently results in distortion of the mounting surfaces on the cutter body thereby preventing the cutter from running true in further use.

One object of the present invention is to overcome this difficulty by dividing the cutter body into two parts, one of which has the mounting surface thereon and is relatively rigid, and the other of which carries the cutting teeth and is sufficiently distortable to seat accurately on the rigid part when clamped thereto.

Another object is to construct the two parts of the body so that the rigid part may form an inertia wheel, and this, without interfering with resharpening of the cutter from time to time.

The invention also resides in the novel construction of the tooth supporting part.

Other objects and advantages of the invention will become apparent from the following detailed description taken in connection with the accompanying drawing in which Figure 1 is a face view of a cutter embodying the present invention.

Fig. 2 is a section taken along the line 2—2 of Fig. 1.

Fig. 3 is a fragmentary sectional view of a modified form of cutter.

For purposes of illustration, the invention is shown in the drawing embodied in two types of milling cutters comprising an annular series of teeth 10 projecting radially and also axially from the periphery of a body 11. The teeth 10 define chip slots 12 between them, and their leading faces 13 terminate in cutting edges 14. These edges may be formed directly on the teeth where high speed steel is used as the cutting material. Or, as shown, the leading side of the tooth may be recessed to provide seats 15 for blocks or tips 16 of hard cutting material brazed or otherwise bonded to the seats.

In accordance with the present invention, the body 11 is divided into two parts 17 and 18 which are adapted to interfit with each other in accurately centered and mating relation. The part 17, which may be cast or forged, is made relatively heavier and rigid so as not to be subject to distortion and is formed with a central bore 19, a flat machine end face 20, and a keyway 21 which provide surfaces by which the part may be mounted on an arbor, a spindle, or other rotary support of conventional design.

To facilitate the cutting of metal at high speed, the body part 17 may, as shown, be formed with a flange 22 substantially larger than the cutter proper and axially spaced from the teeth 10 and of substantial thickness and large diameter so as to constitute an inertia wheel that provides sufficient flywheel effect to prevent vibration incident to the engagement of the successive cutter teeth with the work.

The other body part 18 is of substantially lighter construction and comprises a ring of steel or the like with which the teeth 10 are, in this instance, made integral. For this purpose, the ring and the teeth may be milled from a forged annulus of the thickness necessary to provide the teeth of proper width measured axially of the ring. In the case of a slotting cutter as shown in Fig. 3, both sides of the annulus would be milled away to provide cutting edges 23 projecting axially from both sides of the ring 18. To form a side mill as shown in Fig. 2, only one side of the ring is milled, the side cutting edges 23 projecting the desired distance from the exposed end of the ring. It will be apparent that various other types and sizes of milling cutters may be formed simply by varying the external diameter of the ring and its thickness.

The cutter ring 18 is secured detachably to the body part 17 by an annular series of screws 24 projecting through holes 25 formed in the ring 18 and extending parallel to the axis thereof. Screws of the socket head type are preferably employed with their ends threading into tapped registering holes 26 in the flywheel 17 with their heads seated in counterbores in the outer face of the ring 18. By tightening the screws, the flat end face 27 of the ring 18 is clamped solidly against the machined face 20 on the body part 17, the two faces being accurately located perpendicular to the rotational axis of the cutter.

To center the ring 18 accurately on the part 17, the latter is formed with a short hub 28 whose external surface 29 is tapered and converges outwardly to mate with a complemental and correspondingly tapered internal surface formed on the ring 18 adjacent the end face 27. The cross section of the ring 18 is sufficiently small so that the ring may, if it be distorted slightly, be bent under the clamping force of the screws 24 and brought into full contact with both the flat machined face 20 and the centering hub 28. As a result, the cutting edges on the teeth are always located in precise relation to the mounting surfaces 20 and 29 on the body part 17 even though the ring 18 may be distorted.

Such distortion may occur under the heating incident to replacing one of the tooth tips 16 or building up a high speed steel tooth damaged in service use. In such a case, the screws are removed to permit detachment of the ring from the body part 17. While the ring is thus separated, the damaged tooth is heated to the required temperature and repaired. Then, the detached ring is clamped by screws onto the hub of a fixture (not shown) which is contoured to correspond precisely to the mounting surfaces of the cutter body part 17. In thus forcing the ring into the fixture seat, any thermal distortion of the ring incident to the repairing operation is removed, and the ring and cutter teeth are held in the precise relation they occupy in the final cutter assembly. While thus held, the teeth of the repaired cutter are sharpened, thereby locating all of the cutting edges in the same positional relation with respect to the ring axis.

After sharpening, the cutter ring is removed from the fixture and replaced onto the body part 17. If the thermal distortion has become permanent, the ring will, as it is forced down over the hub 28 and the screws 24 are tightened, be bent sufficiently to seat properly at all points against the mounting face 20 and the tapered hub surface 29. With the ring thus mounted and again centered accurately on the body part 17, all of the cutting edges on the teeth will bear precisely the same relation to the cutter mounting surface 19 and any distortion that may have been caused by heating of the ring during repairing will have no detrimental effect.

Formation of the cutter teeth on the separate ring 18 has numerous other advantages. It provides a simple and inexpensive mounting for the cutter teeth and yet provides great rigidity in their support. The teeth are associated directly with a flywheel and yet may be removed quickly and handled easily without the flywheel during replacement or sharpening.

I claim as my invention:

1. A rotary cutter comprising a rigid body for rotation about an axis and having an annular face disposed about said axis and an adjoining surface tapered with respect to the axis, a ring adapted to fit against said annular face and having an internal surface mating with said tapered surface, and means for anchoring said ring to said body to clamp the same against said annular end face and tapered surface, said ring having cutting teeth at the periphery thereof.

2. A rotary cutter comprising a rigid body for rotation about an axis and having an annular face disposed about said axis and an adjoining surface tapered with respect to said axis and converging away from said body, a ring adapted to fit against said annular surface and having an internal surface mating with said tapered surface, and means for anchoring said ring to said body to clamp the same against said annular end face and tapered surface, said ring having cutting teeth at the periphery thereof.

3. A rotary cutter comprising a rigid body for rotation about an axis, an integral hub on said body having a flat annular end face disposed about said axis and an adjoining surface tapered with respect to the axis, a ring adapted to fit against said annular face and having an internal surface mating with said tapered surface, and means for anchoring said ring to said body to clamp the same against said annular end face and tapered surface, said ring having cutting teeth at the periphery thereof.

4. A rotary cutter comprising a rigid body for rotation about an axis, an integral hub projecting therefrom having a flat annular end face disposed about said axis and an adjoining surface tapered with respect to said axis, and converging away from said body, a ring adapted to fit against said annular face and having an internal surface mated with said tapered surface and means for anchoring said ring to said body to clamp the same against said annular end face and tapered surface, said ring having cutting teeth at the periphery thereof.

CHARLES E. KRAUS.